(12) United States Patent
Lim

(10) Patent No.: US 9,060,309 B2
(45) Date of Patent: Jun. 16, 2015

(54) RADIO RESOURCE DIVISION FOR COMPENSATING RATIO CHANGES OF OTHER CLUSTERS

(75) Inventor: Jaewon Lim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/112,469

(22) PCT Filed: Dec. 27, 2011

(86) PCT No.: PCT/KR2011/010148
§ 371 (c)(1),
(2), (4) Date: Oct. 17, 2013

(87) PCT Pub. No.: WO2012/144721
PCT Pub. Date: Oct. 26, 2012

(65) Prior Publication Data
US 2014/0045513 A1    Feb. 13, 2014

Related U.S. Application Data

(60) Provisional application No. 61/476,332, filed on Apr. 18, 2011.

(51) Int. Cl.
*H04W 28/18* (2009.01)
*H04W 92/12* (2009.01)

(52) U.S. Cl.
CPC .............. *H04W 28/18* (2013.01); *H04W 92/12* (2013.01)

(58) Field of Classification Search
USPC .............. 455/447, 452.2, 509, 522, 562.1
See application file for complete search history.

(56) References Cited

U.S. PATENT DOCUMENTS

2008/0304446 A1*  12/2008  Kimura et al. ............... 370/329
2009/0249153 A1*  10/2009  Zhang ........................ 714/748

OTHER PUBLICATIONS

Berry et al., "Cross-Layer Wireless Resource Allocation", IEEE Signal Processing Magazine, vol. 21, No. 5, pp. 59-68, Sep. 2004.
Huang et al., "Adaptive Resource Allocation for Multimedia QoS Management in Wireless Networks", IEEE Transactions on Vehicular Technology, vol. 53, No. 2, pp. 547-558, Mar. 2004.

* cited by examiner

*Primary Examiner* — Sam Bhattacharya
(74) *Attorney, Agent, or Firm* — Birch, Stewart, Kolasch & Birch, LLP

(57) ABSTRACT

The present invention relates to a method in which a management station divides radio resources for base stations which belong to a plurality of groups in a wireless communication system, and comprises the steps of: receiving a first message requesting an increase in resource allocation from at least one base station which belongs to a first group within a first cluster; receiving a second message requesting an increase in resource allocation from at least one base station which belongs to a second group within a second cluster; and changing each of the resource division ratios of the first group and the second group within the first cluster and the second cluster, wherein the resource division ratios of the first group and the second group are changed based on necessary resource information within the first message and the second message.

8 Claims, 6 Drawing Sheets

RADIO RESOURCE DIVISION FOR COMPENSATING RATIO CHANGES OF OTHER CLUSTERS

This application is the National Phase of PCT/KR2011/010148 filed on Dec. 27, 2011, which claims priority under 35 U.S.C. 119(e) to U.S. Provisional Application No. 61/476,332 filed on Apr. 18, 2011, all of which are hereby expressly incorporated by reference into the present application.

BACKGROUND OF THE INVENTION

1. Field of the Invention

The present invention relates to allocation of radio resource in a wireless communication system and, more particularly, to allocation of radio resource to compensate for ratio changes in other clusters.

2. Related Art

As techniques operated in a small cell form such as a femtocell, a wireless local areal network (WLAN) access point (AP), a mobile AP, and the like, have been increasingly used, interference management among cells is under discussion, and a method for sharing limited radio resources by a plurality of wireless communications providers through network virtualization such as a mobile virtual network operator (MVNO), network resale, and the like, is dealt with.

As for inter-cell interference management, a degradation of performance due to inter-cell interference in an environment in which a single network operator operates several cells with various wireless infrastructures should be resolved. To this end, a method of using a different frequency band without interference with neighbor cells and a method of reducing interference by appropriately controlling power while using a different frequency band have been proposed.

Also, network virtualization may be defined as a technique of making only logical resource seen to users, while hiding physical characteristics of resource. Based on network virtualization, a plurality of service providers may divide networks of one or more physical network providers into a plurality of heterogeneous virtual networks to provide services having a different distinct feature.

Virtualized resource is a wireless network infrastructure such as an access point (AP) or a base station (BS). Through virtualization, the same wireless network infrastructures are shared and used virtually independently for different purposes.

FIG. 1 illustrates an exemplary system employing virtualization in a wireless communication environment.

Referring to FIG. 1, the exemplary system includes a virtual network provider 10 providing various functions and services such as VoIP, a streaming service, content service, and the like. The virtual network provider 10 may be a mobile virtual network operator (MVNO). In general, the virtual network provider 10 is an entity operated separately, apart from a physical network provider 20. The virtual network provider provides a data service by using an infrastructure thereof, without owning a physical infrastructure such as a mobile switching center (MSC), a base station (BS) 21, an access network (AN) 22, or the like, in a mobile communication environment.

In order to maintain quality of service (QoS) provided through the physical infrastructure, the virtual network provider 10 makes a service level agreement (SLA), or the like, with the physical network provider 20. In this case, the physical network provider 20 should allocate resource such that QoS, or the like, based on the SLA is guaranteed for the virtual network provider 10 in the physical infrastructure. To this end, in the access network (AN) 22 environment, the physical network providers 20 should allocate radio resource to BSs belonging to the virtual network provider 10 according to set proportions.

SUMMARY OF THE INVENTION

A physical network provider that allocates resource to a plurality of virtual network providers should be able to allocate resource according to predetermined proportions for each virtual network provider.

Also, in a case in which additional radio resource is required to be additionally provided to a virtual network provider in a particular area in which a plurality of virtual network providers provide services, division ratios (or allocation ratios) of radio resource in the particular area should be changed in consideration of a required amount of resource.

Also, a physical network provider should maintain division ratios of radio resource in a physical network infrastructure of within a predetermined range of geographical area with respect to a plurality of virtual network providers, and when a smaller amount of resource is allocated to a virtual network provider in a particular area, the physical network provider should compensate for the smaller amount of resource of the corresponding virtual network provider in the process of resource allocation in a different area.

According to an aspect of the present invention, there is provided a method for allocating radio resource for base stations belonging to a plurality of groups by a management entity in a wireless communication system, including: receiving a first message requesting an increase in resource allocation from at least one base station belonging to a first group of a first cluster; receiving a second message requesting an increase in resource allocation from at least one base station belonging to a second group of a second cluster; and changing resource division ratios between the first groups and the second groups in the first cluster and the second cluster, respectively, wherein the resource division ratios between the first group and the second group are changed on the basis of required resource information included in the first message and required resource information included in the second message.

In the changing of the resource division ratios, the division ratio of resource for the first group of the first cluster may be increased and the division ratio of resource for the second group of the second cluster may be increased.

The method may further include: transmitting a message indicating that resource is allocated according to the changed resource division ratios to at least one base station belonging to the first group and the second group of the first cluster and the second cluster, respectively.

The method may further include: receiving a message indicating that there is extra resource from at least one base station belonging to the second group of the first cluster, wherein the resource division ratios between the first group and the second group may be changed in consideration of the extra resource information included in the message indicating the presence of extra resource.

The first and second groups may be discriminated according to service providers operating base stations belonging to each group.

The radio division ratios may be ratios of bandwidths allocated to the first group and the second group.

In the changing of the resource division ratios, the resource division ratios between the first group and the second group may be changed such that it is maintained for the base stations of the first cluster and the second cluster.

The resource division ratios between the first group and the second group may be determined in advance according to a service level agreement (SLA).

According to another aspect of the present invention, there is provided a management entity allocating radio resource for base stations belonging to a plurality of groups in a wireless communication system, including: a transceiver unit configured to perform communication with the base stations; and a controller configured to control the transceiver unit, wherein the controller receives a first message requesting an increase in resource allocation from at least one base station belonging to a first group of a first cluster, receives a second message requesting an increase in resource allocation from at least one base station belonging to a second group of a second cluster, and changes resource division ratios between the first groups and the second groups in the first cluster and the second cluster, respectively, wherein the resource division ratios between the first group and the second group are changed on the basis of required resource information included in the first message and required resource information included in the second message.

In the case of the method of changing division ratios of radio resource disclosed in the present disclosure, division ratios of radio resource can be changed according to radio resource demand within a predetermined range of geographical area. In detail, when a service provider requires additional radio resource in a particular geographical area, if there is extra radio resource in a different geographical area, the service provider can additionally obtain a resource division ratio according to a compensation method for each service provider of areas.

In the case of the method of changing division ratios of radio resource disclosed in the present disclosure, even when an agreement is maintained between service providers in a wireless communication environment, insufficient or extra wireless communication resource may be effectively exchanged and used between or among service providers.

DESCRIPTION OF EXEMPLARY EMBODIMENTS

Figure 1:
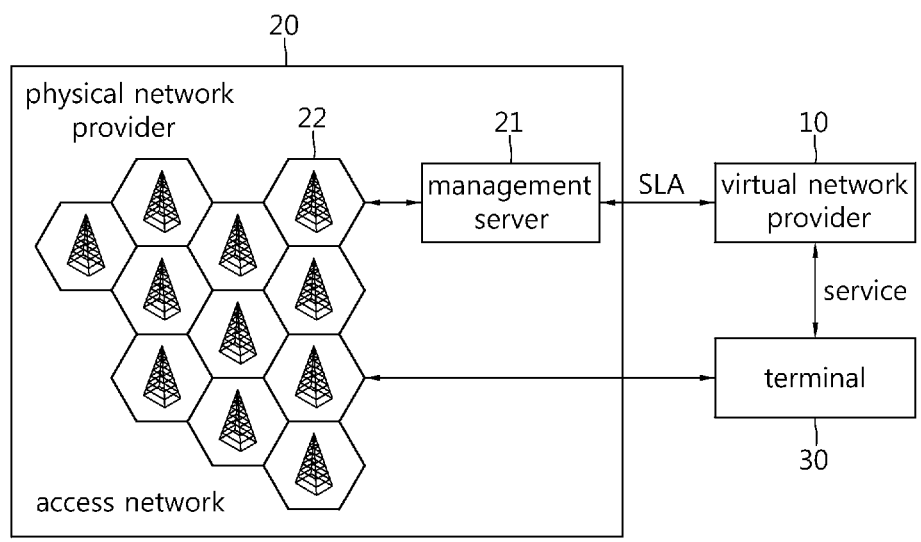
FIG. 1 is a view illustrating an exemplary system employing virtualization in a wireless communication environment.

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "connected with" another element, it can be directly connected with the other element or intervening elements may also be present. In contrast, when an element is referred to as being "directly connected with" another element, there are no intervening elements present.

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

Hereinafter, a term of terminal is used, but the terminal may also be called by other names such as user equipment (UE), mobile equipment (ME), mobile station (MS), user terminal (UT), subscriber station (SS), mobile subscriber station (MSS), wireless device, handheld device, and access terminal (AT).

Recently, placement of wireless access points (APs) of operators using the same frequency band, like a wireless local area network (WLAN), has been spread. Spreading of placement of APs may cause mutual interference, and such mutual interference may cause a problem in which, as well as wireless operators providing physical networks through APs, even operators who want to lease APs of the wireless operators through network virtualization, network resale, or the like, cannot satisfy network quality desired for users.

To this end, operators may make a service level agreement (SLA), and radio resource is used by dividing frequency or time according to each operator so as to be used according to the SLA, thus managing interference between APs.

However, in the case in which radio resource of the overall network is divided and used according to the SLA, resource cannot be effectively allocated due to a difference in network usages of respective users of respective operators in each area. Namely, users of a particular operator may not secure a sufficient network bandwidth required for their use, while users of a different operator may be allocated an unnecessary bandwidth.

The present disclosure proposes a method for determining resource division ratios of each operator and changing them. To this end, the entire network in which a plurality of operators provide services is divided into clusters, and BSs of each cluster allocate radio resource to terminals (or user equipment (UE)s in consideration of network usages of users of each operator.

Also, the present disclosure proposes a method for changing division ratios of radio resource. According to this method, when division ratios of radio resource for respective operators in a particular cluster are changed so an allocation of radio resource to a particular operator is limited, a division ratio of radio resource to the particular operator in a different cluster is changed in order to compensate for the limited radio resource.

Figure 2:
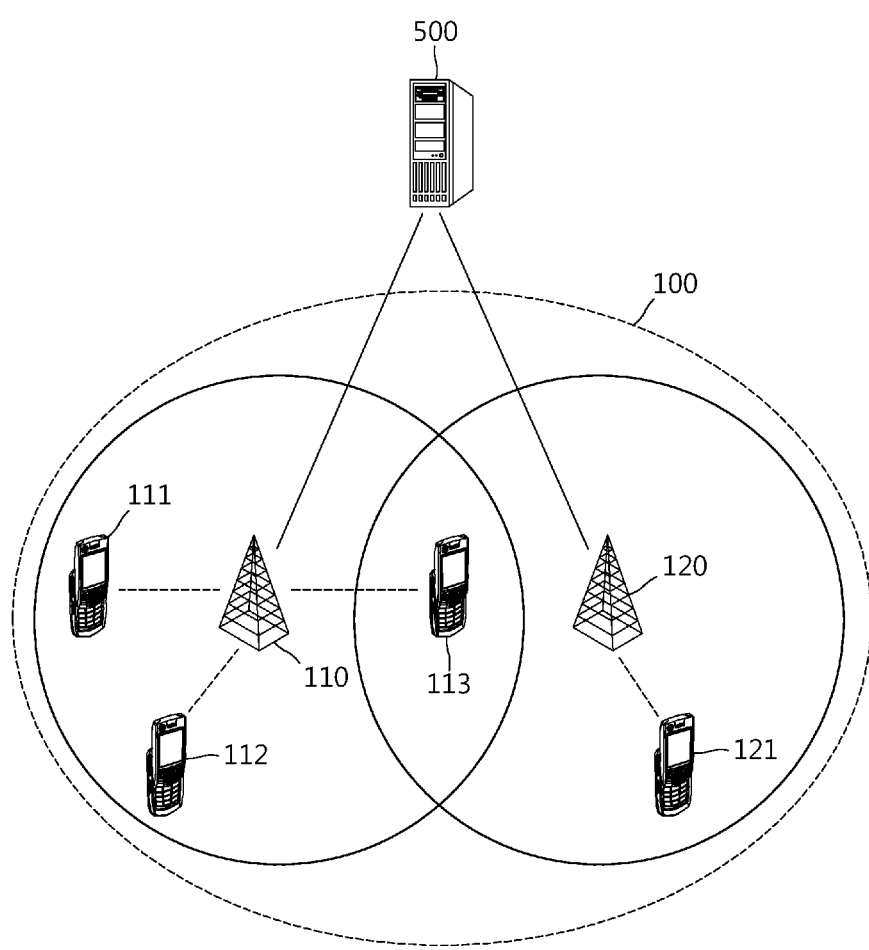
FIG. 2 is a view illustrating an environment in which radio resource is allocated to a cluster of base stations (BSs) according to division ratios.

FIG. 2 illustrates an environment in which radio resource is allocated to a cluster according to a division ratio of each group thereof. A method for allocating resource to each group of a cluster according to a division ratio of radio resource employable in the present disclosure will be described with reference to FIG. 2.

A cluster is an aggregation of BSs in a wireless communication system. For example, a cluster refers to an aggregation of BSs belonging to a particular geographical area. A particular cluster may include BSs providing communication services of different service providers.

Referring to FIG. 2, a first cluster 100 includes a plurality of BSs 110 and 120. The plurality of BSs may be classified as a first BS (AP1) 110 belonging to a first group and a second BS (AP2) 120 belonging to a second group.

The first and second groups may be divided according to service providers that operate BSs belonging to each group. Thus, in FIG. 2, terminals 111, 112, and 113 performing communication with the AP1 110 use radio resource allocated for the first service provider SP1 providing a communication service for the first group, and terminals 121 performing communication with the AP2 120 uses radio resource allocated for the second service provider SP2 providing a communication service for the second group.

The AP1 110 and the AP2 120 are illustrated to represent physically different BSs or APs, but in this case, a configuration in which the AP1 110 and the AP2 120 are implemented as a single BS or AP operating independently for logically different service providers is not excluded.

Referring to FIG. 2, a management entity 500 managing the BSs within the cluster 100 may be placed. The management entity 500 may be configured to manage BSs of a different cluster, as well as manage BSs operating for different service providers of a particular cluster. Thus, the management entity 500 may perform a management process on BSs of a different cluster (not shown), as well as the BSs 110 and 120, etc., of the first cluster 100.

The management station 500 may be implemented in the form of performing a management operation by using a plurality of servers, as well as being implemented in a physically single server.

The management entity 500 may determine to allocate radio resource to the BSs belonging to the first and second groups according to division ratios of radio resource for each group. The division ratios of radio resource may have been determined according to a service level agreement (SLA) with the first SP1 providing a communication service for the first group and the SP2 providing a communication service for the second group.

For example, in a case in which it is determined in advance that the SP1 and SP2 have a radio resource division ratio of 1:1 through the SLA, or the like, the AP1 110 as a BS belonging to the first group and the AP2 120 as a BS belonging to the second group are controlled to allocate radio resource in the same ratio.

However, in the example of FIG. 2, the number of terminals 111, 112, and 113 performing communication with the AP1 110 is greater than the number of terminals 121 performing communication with the AP2 120. Thus, an amount of radio resource required for processing traffic of the terminals 111, 112, and 113 connected to the AP1 110 in the first cluster 100 is insufficient, while an amount of radio resource required for processing traffic of the terminals 121 connected to the AP2 120 is excessive. This problem may arise when an amount of terminals subscribed to the SP1 in a single cluster is so large as to exceed a range of traffic allocable to each service provider.

Hereinafter, a method for changing ratios of allocated radio resource in consideration of network usages of users of each operator between clusters will be described with reference to FIGS. 3 and 4.

Figure 3:
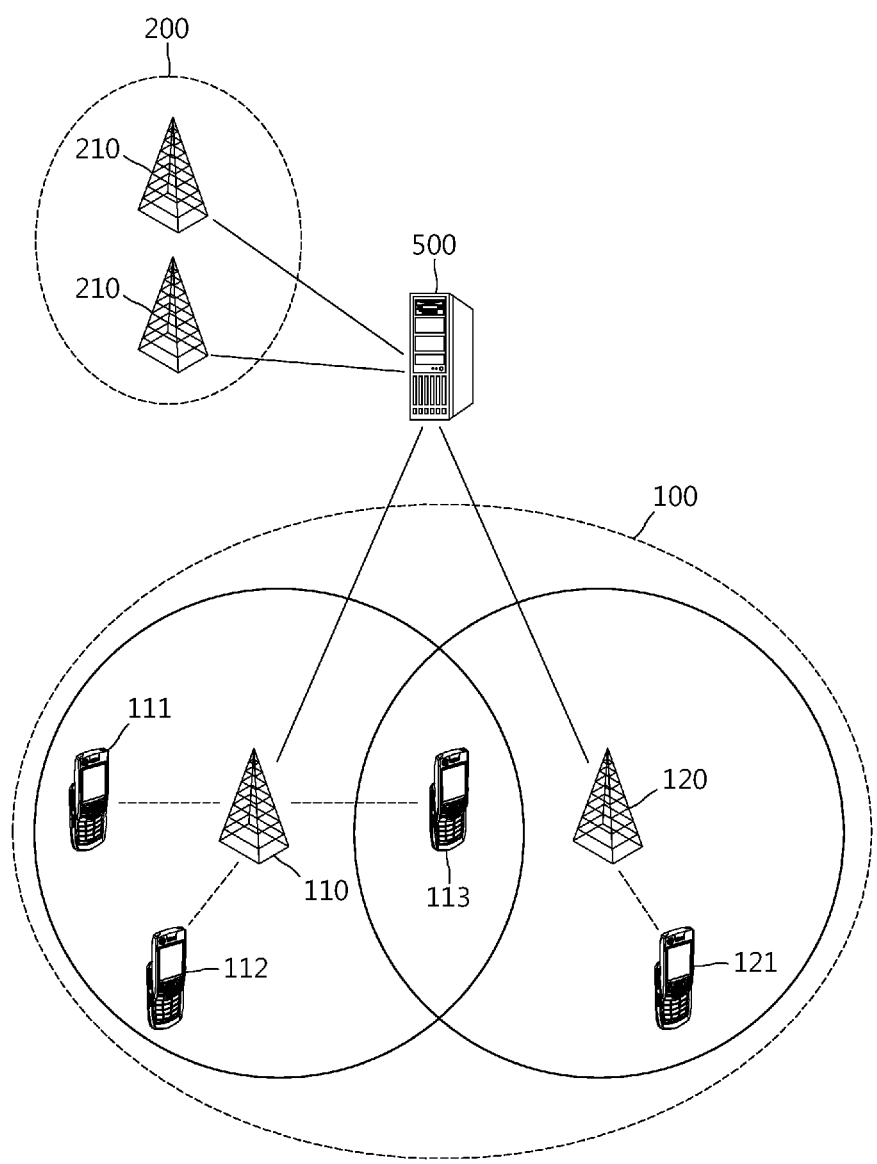
FIG. 3 is a view illustrating an environment in which radio resource is allocated to a plurality of clusters according to division ratios of each group under the control of a management entity.

FIG. 3 illustrates an environment in which radio resource is allocated to a plurality of clusters according to a division ratio of each group.

Referring to FIG. 3, the management entity 500 in the wireless communication system may classify the first BS (SP1) 110, the second BS (SP2) 120, a third BS (SP3) 210, and a fourth BS (SP4) 220, and the like, constituting the wireless communication system into clusters and manage them. The first cluster 100 and the second cluster 200 managed by the management entity 500 may be an aggregation of BSs positioned in different geographical areas.

The management entity 500 may instruct to change a ratio of radio resource for BSs belong to each operator to allocate within the first cluster 100 and the second cluster 200 in consideration of network usage of users of each operator in each cluster.

In FIG. 3, the SP1 110 of the first cluster 100 and the SP3 210 of the second cluster 200 are BSs operated by the first service provider SP1, which belong to the first group. Also, the SP2 120 of the first cluster 100 and the SP4 220 of the second cluster 200 are BSs operated by the second service provider SP2, which belong to the second group.

When a division ratio of radio resource for each operator in a particular cluster is changed, the management entity 500 may change a division ratio of radio resource in a different cluster for the purpose of compensation.

In detail, in certain embodiments, when the management entity 500 receives a message indicating that additional allocation of radio resource is required in the first cluster from the SP1 110 belonging to the first group and receives a message indicating that additional allocation of radio resource is required in the second cluster from the SP4 220 belonging to the second group, the management entity 500 may change a division ratio of radio resource for each group in the first cluster and that in the second cluster. Namely, in this case, the management entity 500 may adjust the ratio of radio resource to apply it differently to the clusters such that the resource division ratio for the first group is increased in the first cluster and the resource division ratio for the second group is increased in the second cluster.

When the division ratios of radio resource for each group are differently changed for several clusters, the management entity 500 may change the division ratios for each group such that the division ratios are compensated by groups of the entire clusters. Namely, when a resource division ratio for the first group is increased for the first cluster, the management entity 500 may change a resource division ratio for the second cluster such that the resource division ratio for the second group of the second cluster can be increased on the basis of the ratio reduced with respect to the second group.

Also, in another embodiments, when a message indicating that there is extra radio resource is additionally received from the SP2 120 belonging to the second group of the first cluster, as well as receiving the additional allocation request from the SP1 100, the management entity 500 may adjust the resource division ratio to be increased for the first group in the first cluster.

Hereinafter, a method for changing a radio resource division ratio between clusters in a wireless communication system according to an embodiment disclosed in the present disclosure will be described with reference to FIG. 4.

Figure 4:
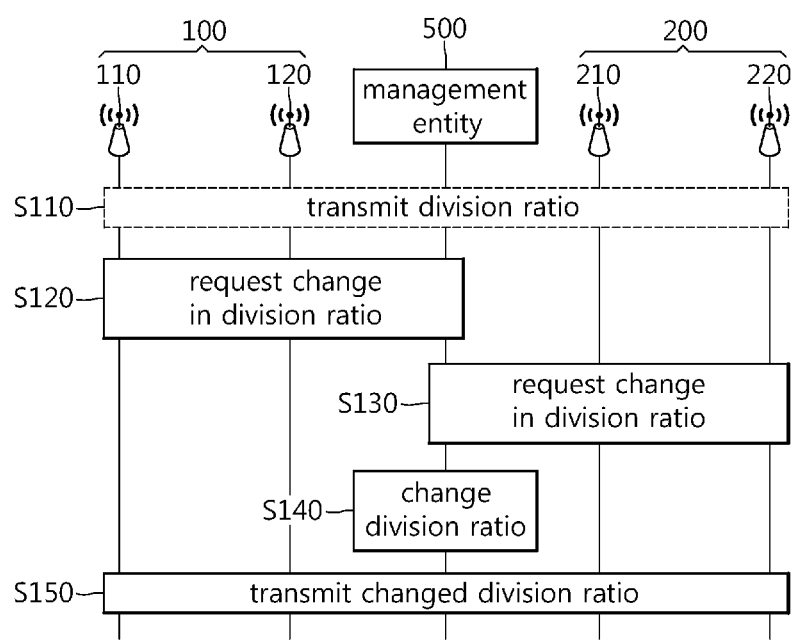
FIG. 4 is a flow chart illustrating a method for changing division ratios of radio resource for each group of a plurality of clusters according to an embodiment disclosed in the present disclosure.

FIG. 4 is a flow chart illustrating a method for changing division ratios of radio resource for each group of a plurality of clusters according to an embodiment disclosed in the present disclosure.

First, the management entity 500 transmits information regarding resource division ratios to BSs of the clusters (S110). The management entity 500. The management entity 500 transmits a division ratio of resource for each group in the first cluster 100 to the BSs of the first cluster 100 and a division ratio of resource for each group in the second cluster 200 to BSs of the second cluster 200. The radio division ratios may be equally determined or differently determined for each cluster. In particular, the management entity 500 may determine the same resource division ratio for each cluster according to the SLA and transmit the same.

Information regarding the resource division ratios transmitted by the management entity 500 may indicate ratios of resource allocable to respective groups or a maximum value of allocable radio resource. Also, the information regarding resource division ratio may have different values according to a value based on a division scheme of radio resource, for example, according to whether it is based on a frequency division scheme or a time division scheme.

Thereafter, the management entity 500 receives a message requesting a change in the transmitted radio resource division ratio from a BS of the first cluster 100 (S120). Also, the management entity 500 may receive a message requesting a change in the transmitted radio resource division ratio from a BS of the second cluster 200 (S130). In this case, the management entity 500 may determine resource division ratios for each group in the first cluster 100 and the second cluster 200 in consideration of the resource division ratios included in the messages requesting the changes (S140).

The messages requesting changes in the radio resource division ratios received by the management entity 500 include an amount of radio resource required for the BS or an amount of radio resource excessive for the BS. The amounts of radio resource may be represented by a bandwidth of an actual radio resource, may be expressed by a unit indicating an increment or decrement level, or may be expressed by signs such as (+)/(−) as necessary.

Thereafter, the management entity 500 transmits information regarding the determined resource division ratio for each group to the BSs of the first cluster 100 or the BSs of the second cluster (S150).

Hereinafter, a method for changing a radio resource division ratio between clusters in a wireless communication system according to an embodiment disclosed in the present disclosure will be described with reference to FIG. 5.

Figure 5:
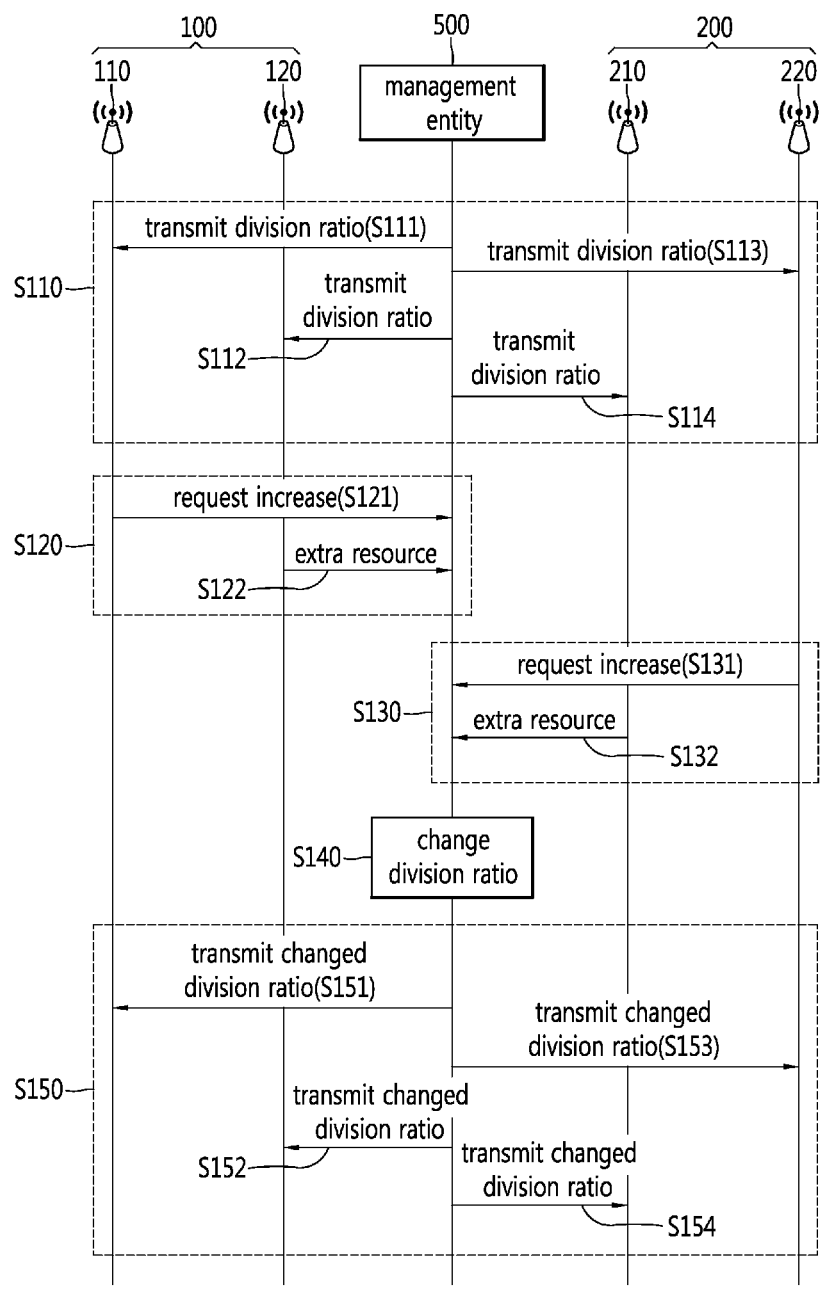
FIG. 5 is a flow chart illustrating a method for changing division ratios of radio resource illustrated in FIG. 4.

FIG. 5 is a flow chart illustrating a method for changing division ratios of radio resource illustrated in FIG. 4.

First, the management entity 500 transmits information regarding resource division ratios to the BSs of the first cluster 100 and the second cluster 200 (S110). Namely, the management entity 500 may transmit information regarding a ratio of allocable radio resource for the terminals connected to AP1, AP2, AP3, and AP4 (S111, S112, S113, and S114), respectively. For example, in a case in which a ratio between radio resource allocated to the first group and radio resource allocated to the second group is 1:1, a message indicating that the ratio between radio resources allocable to the AP1 110 and the AP2 120 is 1:1 in the first cluster may be transmitted (S111 and S112). Also, a message indicating that the ratio between radio resources allocable to the AP3 210 and the AP4 220 is 1:1 in the second cluster may be transmitted (S113 and S114).

Thereafter, the management entity 500 receives a message requesting a change in the transmitted radio resource division ratio from a BS of the first cluster 100 (S120). The message requesting a change in the radio resource division ratio may be a message indicating whether radio resource allocated by the BS according to the transmitted radio resource division ratio is sufficient for communication with terminals.

In the case of the example illustrated in FIG. 3, a required amount of radio resource exceeds the transmitted radio resource division ratio, the AP1 110 is required to allocate additional resource to the terminals 111, 112, and 113, so it may transmit a radio resource increase request to the management entity 500 (S121). Also, since resource remains even after radio resource is allocated to the terminal 121 according to the transmitted radio resource division ratio, the AP2 120 may transmit a message indicating the presence of extra radio resource to the management entity 500 (S122).

Also, the management entity 500 may receive a message requesting a change in the transmitted radio resource division ratio even from a BS of the second cluster 200 (S130). For example, the management entity 500 may receive a message requesting an increase in radio resource from the SP4 220 and receive a message indicating the presence of extra radio resource from the SP3 210 (S132).

Thereafter, the management entity 500 may determine a division ratio of resource for each group of the first cluster 100 and the second cluster 200 on the basis of messages requesting a change in radio resource received from the BS (S140).

For example, the management entity 500 may determine to increase a resource division ratio for the first group to which the AP1 belongs in the first cluster on the basis of the radio resource increase request from the AP1. Also, the management entity 500 may determine to increase a resource division ratio for the second group to which the AP4 belongs in the second cluster on the basis of the radio resource increase request from the AP4.

Also, in increasing the radio division ratio for the first group of the first cluster, the management entity 500 may determine the increased division ratio on the basis of extra resource information received from the AP2. Similarly, in increasing the radio division ratio for the second group of the second cluster, the management entity 500 may consider extra resource information received from the AP3. For example, with respect to the first cluster, the management entity 500 may determine a resource division ratio between the first and second groups to be 3:1.

Also, in determining a resource division ratio for each group of the second cluster, the management entity 500 may consider a ratio changing in the first cluster. Namely, with respect to a group for which allocable resource is reduced due to a change in the resource division ratio in the first cluster, the management entity 500 may change the radio division ratio thereof such that it is compensated for in the second cluster.

For example, in a case in which the management entity 500 determines that a resource division ratio between the first group and the second group of the first cluster is 3:1, the management entity 500 may change the resource division ratio between the first group and the second group of the second cluster into 1:3. Thus, in terms of the entirety of the first cluster and the second cluster, the management entity 500 may maintain the resource division ratio between the first group and the second group through compensation.

Thereafter, the management entity 500 transmits information regarding the determined resource division ratios for each group to the BS of the first cluster 100 or the BSs of the second cluster 200 (S150). Namely, when the radio resource division ratios are changed, the management entity 500 transmits the changed radio resource division ratios to the BSs of the respective clusters (S151, S152, S153, and S154).

Figure 6:
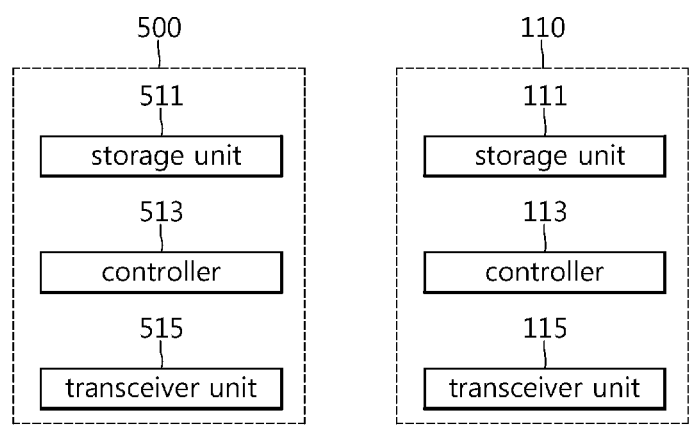
FIG. 6 is a block diagram of a base station and a management entity of a wireless communication system according to embodiments of the present invention.

FIG. 6 is a block diagram of a base station and a management entity of a wireless communication system according to embodiments of the present invention.

As illustrated in FIG. 6, a BS 110 includes a storage unit 111, a controller 113, and a transceiver unit 115, and a management entity 500 includes a storage unit 511, a controller 513, and a transceiver unit 515.

The storage unit 111 of the BS 110 stores the methods performed by any one BS among the methods illustrated in FIGS. 4 and 5, and the controller 113 executes the methods stored in the storage unit 111, thus controlling the storage unit 111 and the transceiver unit 115. FIG. 6 illustrates the configuration of the BS 110, but it is not limited to the configuration of the first BS (AP1) in FIGS. 2 through 5 and the BSs such as the second BS (AP2), the third BS (AP3), the fourth BS (AP4), and the like, have the same configuration.

Meanwhile, the storage unit 511 of the management entity 500 stores methods performed by the management entity among the methods illustrated in FIGS. 4 and 5, and the controller 513 113 executes the methods stored in the storage unit 511, thus controlling the storage unit 511 and the transceiver unit 515.

Meanwhile, the wireless system employing the method for changing a radio resource division ratio disclosed in the present disclosure is not limited to the mobile communication environment or the operational environment of the MVNO as described above, and may be applicable to various systems configured such that a management entity controls radio resource of a plurality of BSs or APs, like a WLAN, or any other systems using short-range communication.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The above-described embodiments include various aspects of examples. Although all possible combinations for describing the various aspects may not be described, those skilled in the art may appreciate that other combinations are possible. Accordingly, the present invention should be construed to include all other replacements, modifications, and changes which fall within the scope of the claims.

What is claimed is:

1. A method for allocating radio resources for base stations belonging to a plurality of groups by a management entity in a wireless communication system, the method comprising:
receiving, by the management entity, a first message requesting an increase in resource allocation from at least one base station belonging to a first group of a first cluster;
receiving, by the management entity, a first indicator indicating that there is an extra resource from at least one base station belonging to a second group of the first cluster;
receiving, by the management entity, a second message requesting an increase in resource allocation from at least one base station belonging to a second group of a second cluster;
receiving, by the management entity, a second indicator indicating that there is an extra resource from at least one base station belonging to a first group of the second cluster; and
changing, by the management entity, resource division ratios between the first groups and the second groups in the first cluster and the second cluster, respectively,
wherein the resource division ratios between the first group and the second group are changed on the basis of required resource information included in the first message and required resource information included in the second message, and
wherein the resource division ratios between the first group and the second group are further changed in consideration of extra resource information included in the first and second indicators indicating the presence of an extra resource.

2. The method of claim 1, wherein, in the changing of the resource division ratios comprises that a division ratio of resource for the first group of the first cluster is increased and a division ratio of resource for the second group of the second cluster is increased.

3. The method of claim 2, further comprising:
transmitting at least one message indicating that resource is allocated according to the changed resource division ratios, to said at least one base station belonging to the first group and the second group of the first cluster and the second cluster, respectively.

4. The method of claim 1, wherein the first and second groups are different according to service providers operating base stations belonging to each group.

5. The method of claim 1, wherein the resource division ratios includes a ratio of bandwidth allocated to the first group and the second group.

6. The method of claim 1, wherein, in the changing of the resource division ratios comprises that the resource division ratios between the first group and the second group are changed to be maintained for base stations of the first cluster and the second cluster.

7. The method of claim 6, wherein the resource division ratios between the first group and the second group are predetermined according to a service level agreement (SLA).

8. A management entity allocating radio resources for base stations belonging to a plurality of groups in a wireless communication system, the management entity comprising:
a transceiver configured to perform communication with the base stations; and
a controller configured to control the transceiver,
wherein the controller is further configured to:

receive a first message requesting an increase in resource allocation from at least one base station belonging to a first group of a first cluster,
receive a first indicator indicating that there is an extra resource from at least one base station belonging to a second group of the first cluster,
receive a second message requesting an increase in resource allocation from at least one base station belonging to a second group of a second cluster,
receive a second indicator indicating that there is an extra resource from at least one base station belonging to a first group of the second cluster, and
change resource division ratios between the first groups and the second groups in the first cluster and the second cluster, respectively,
wherein the resource division ratios between the first group and the second group are changed on the basis of required resource information included in the first message and required resource information included in the second message, and
wherein the resource division ratios between the first group and the second group are further changed in consideration of extra resource information included in the first and second indicators indicating the presence of extra resource.

* * * * *